E. L. BERGSTRESSER.
Churn.
No. 46,440.
Patented Feb. 21, 1865.
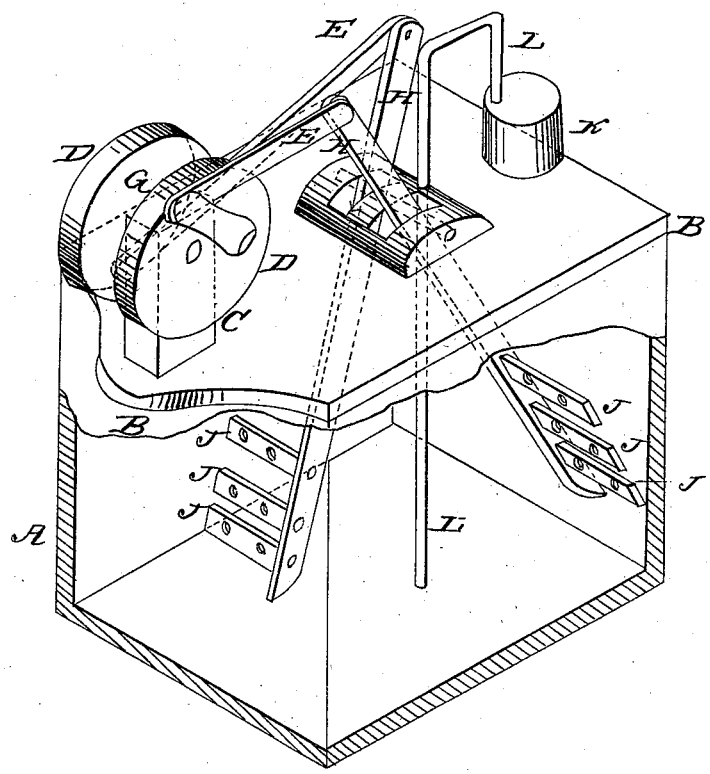

UNITED STATES PATENT OFFICE.

EDWIN L. BERGSTRESSER, OF BERRYSBURG, PENNSYLVANIA.

IMPROVEMENT IN CHURNS.

Specification forming part of Letters Patent No. 46,440, dated February 21, 1865.

*To all whom it may concern:*

Be it known that I, EDWIN L. BERGSTRESSER, of Berrysburg, Dauphin county, State of Pennsylvania, have invented new and useful Improvements in Churns, which I style "The Double-Acting Steam Churn;" and I do hereby declare the following to be an exact description thereof, reference being had to the accompanying drawings, and to the letters of reference marked thereon, making a part of this specification.

The nature of my invention consists in the arrangement of two crank-wheels, attached to two levers on top of the churn, the levers extending into the churn and having perforated beaters on each end; also a reservoir or boiler on the outside of the churn, having a steam-pipe extending down into the churn, so as to inject a continuous flow of steam into the cream during the operation of churning to hasten the butter.

To enable others skilled in the art to make and use my invention, I will proceed to describe its construction and operation, as follows:

A represents the box of the churn with its lid B on top. At one end of the lid is a post, C, with a crank-wheel, D, on each side. On the side of each wheel a pitman, E, is attached by a pin or wrist, G. At the outer end of each pitman is a vertical lever, H, extending into the churn, to which are fastened three or more perforated beaters, J. These beaters are double-acting, and operate alternately back and forth through the cream. Above or near the top of the lid, on the outside, I have a small close vessel, K, containing boiling water, which I design to keep heated by a small lamp placed underneath. A steam-pipe, L, extends from this boiler K through the lid and into the center of the cream, for the purpose of conveying and applying steam to the cream and hastening the churning.

What I claim as my invention, and desire to secure by Letters Patent, is—

The double-acting dashers, with the steam reservoir and pipe, arranged and combined as herein described.

EDWIN L. BERGSTRESSER.

Witnesses:
 S. H. ADAMS,
 JACOB BERGSTRESSER.